(12) United States Patent
Kelemen

(10) Patent No.: US 10,566,098 B2
(45) Date of Patent: Feb. 18, 2020

(54) POSITIONING AND INSPECTION APPARATUSES FOR USE IN NUCLEAR REACTORS

(71) Applicant: GE-Hitachi Nuclear Energy Americas LLC, Wilmington, NC (US)

(72) Inventor: Colin F. Kelemen, Austin, TX (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 696 days.

(21) Appl. No.: 14/942,996

(22) Filed: Nov. 16, 2015

(65) Prior Publication Data

US 2017/0140844 A1 May 18, 2017

(51) Int. Cl.
| | |
|---|---|
| B25B 1/00 | (2006.01) |
| G21C 17/013 | (2006.01) |
| G21C 19/20 | (2006.01) |
| G21C 17/01 | (2006.01) |

(52) U.S. Cl.
CPC ........... *G21C 17/013* (2013.01); *G21C 17/01* (2013.01); *G21C 19/207* (2013.01)

(58) Field of Classification Search
CPC ......... B23P 11/00; B23P 11/027; B23P 19/04; B23P 19/10
See application file for complete search history.

(56) References Cited

U.S. PATENT DOCUMENTS

| | | | |
|---|---|---|---|
| 5,600,687 A | 2/1997 | Welsh | |
| 8,661,645 B2 * | 3/2014 | Lemser | B60C 25/138 157/1.17 |
| 2005/0135904 A1 | 6/2005 | Wivagg et al. | |
| 2007/0146480 A1 | 6/2007 | Judge, Jr. et al. | |
| 2008/0317192 A1 * | 12/2008 | Rowell | G21C 17/01 376/249 |
| 2016/0016267 A1 * | 1/2016 | Beatty | B23K 37/0538 29/559 |
| 2016/0137315 A1 * | 5/2016 | Noel | B64F 5/50 269/17 |
| 2017/0140844 A1 * | 5/2017 | Kelemen | G21C 17/013 |

OTHER PUBLICATIONS

Extended European Search Report and Opinion issued in connection with corresponding EP Application No. 16196839.1 dated Apr. 21, 2017.

* cited by examiner

*Primary Examiner* — Lee D Wilson
(74) *Attorney, Agent, or Firm* — Ryan Alley IP

(57) ABSTRACT

Devices position inspection and operation tools in a nuclear reactor without use of a bridge or other refueling structure well above the reactor core. Devices can selectively join to in-reactor structures like steam dams through clamping that permits limited movement. Clamps can include one or more rollers that allow for controlled, accurate positioning of the devices relative to the structures. Devices include an extension to which the tools can be affixed. Through selective disengagement of joining structures, devices can move over obstacles on the mounting structure. Devices further include controls so that operators positioned outside the reactor can move the device while mounted on a static structure. The controls can further move the inspection tool in other directions with the extension. Devices are useable underwater or submerged in other fluid and may include powering lines or mechanical extensions that permit powering or direct interfacing from operators outside the reactor.

20 Claims, 4 Drawing Sheets

POSITIONING AND INSPECTION APPARATUSES FOR USE IN NUCLEAR REACTORS

BACKGROUND

FIG. 1 is selective view of a related art nuclear core shroud 10, useable in a nuclear reactor like a BWR. Core shroud 10 may be positioned in a downcomer annulus region 20, which is an annular space formed between shroud 10 and an inner wall of a reactor pressure vessel (not shown) that receives fluid coolant flow and directs it downward for entry at a bottom of core 30. Shroud 10 may be a cylindrical structure surrounding core 30 that partitions the reactor into these downward and upward coolant flows on opposite radial sides of shroud 10. One or more jet pump assemblies 40 may line annulus 20 and direct coolant flow in this manner.

After being directed downward past core shroud 10, coolant may then flow up through core 30 inside shroud 10. Core 30 is typically populated by several fuel assemblies (not shown) generating heat through nuclear fission during operation, and the coolant exiting core 30 may be quite energetic and potentially boiling. This energetic fluid flows up through and out of core 30 and shroud 10, potentially into steam separating and drying structures and ultimately to a turbine and generator that convert the energetic flow into electricity. A top portion 15 of shroud 10 may terminate below such drying structures, and various core equipment may rest on or join to shroud 10 about top portion 15, which may be called a steam dam. One or more gussets 16 may be aligned about top portion 15 of shroud 10 to support or join a shroud head (not shown), chimney, or drying structures.

During a reactor outage, such as a refueling outage or other maintenance period, the reactor vessel may be opened and inspected, and internal structures of vessel may be removed. During an outage, loading equipment such as a bridge and trolley above the reactor, and 20-30 feet above core 30 and shroud 10, may move and load new fuel assemblies in core 30. Visual inspections of shroud 10, core 30, and/or any other component can be accomplished with video or camera equipment operated from the bridge or other loading equipment above the reactor during this time.

SUMMARY

Example embodiments include devices useable for inspection or tooling in a nuclear reactor with accurate positioning and minimal vibration. Example devices include rollers that bias against different sides of a static structure in the nuclear reactor such that the device can be moved, such as by rolling, in at least one direction while otherwise rigidly secured to the structure. Example devices are useable with a camera, ultrasonic emitter, or any other inspection device or tool, which may be attached to an extendable arm to reach desired locations potentially deep within a reactor with accurate location. Example devices may mount the rollers on pivotable arms so that the rollers can be selectively engaged with the mounting structure by rotating and/or biasing the arms. If a device includes several roller pairs each on an arm, individual pairs can thus be disengaged to step over gussets or other protrusions from the structure while still remaining movably clamped by other roller pairs. Such selective disengaging and biasing can be driven by extendable connectors like pneumatic cylinders or actuators. Example devices may further include controls or a mechanical extension useable to control the devices from above, such as operators positioned above the reactor while the device is submerged and attached to a steam dam deep in the reactor. The extension, like a drive rod, can be rotated to move the device in one direction while remaining mounted on the static structure. The extension can further be moved to a different location and rotated to move the inspection device or tool in other directions. Additional rollers, connectors, frames, and guiding structures may ensure that example devices are securable and moveable only in desired directions. Example methods include operating such devices by rotating the extension to move the apparatus about the structure, relocating the extension, and then rotating the relocated extension to separately move the inspection device or tooling. During the moving, any rollers or clamps may be released or moveable to avoid protrusions or other interfering parts of the structure.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
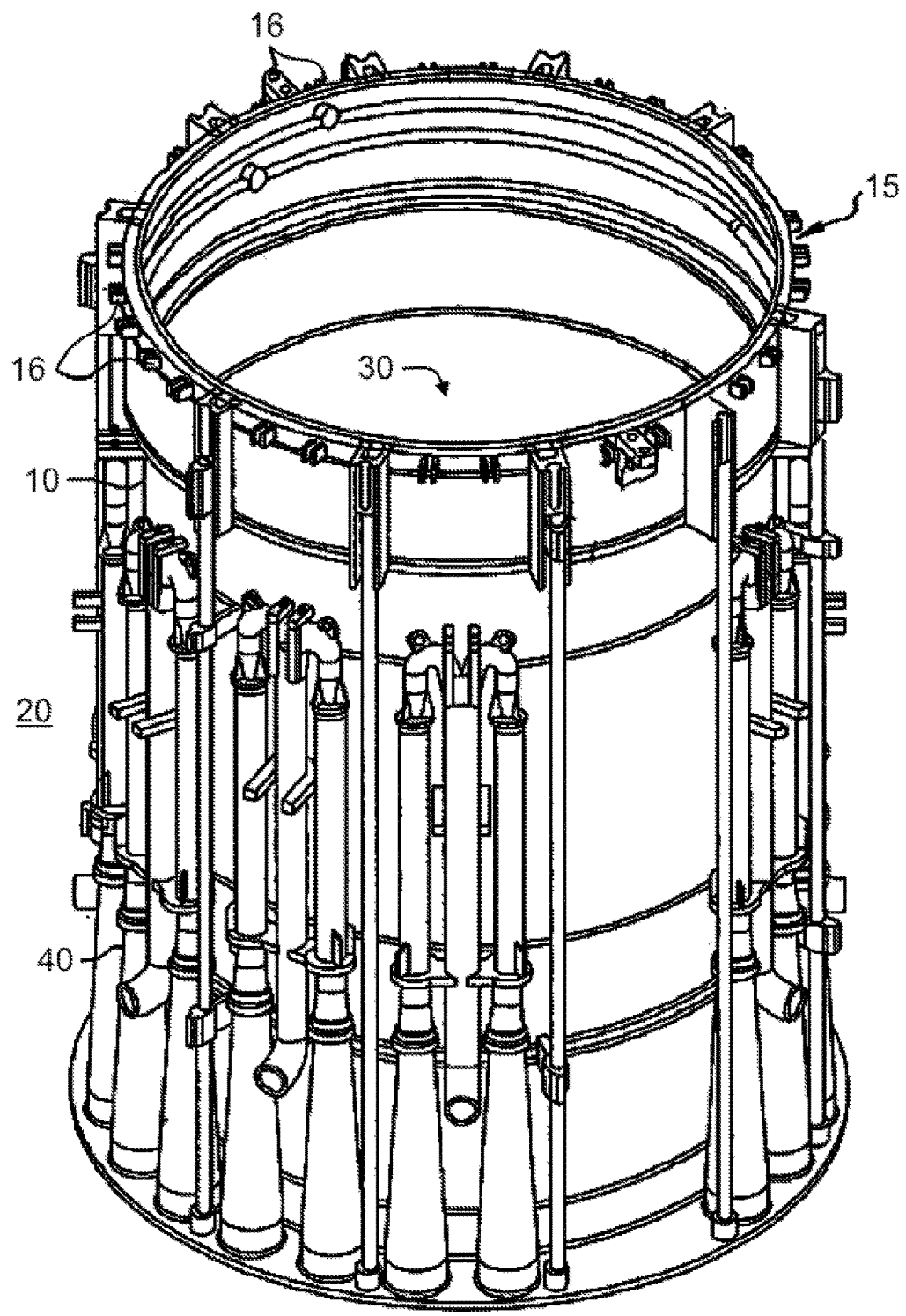
FIG. 1 is an illustration of a related art nuclear power vessel core shroud.

Because this is a patent document, general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

The Inventors have newly recognized that visual inspection of a nuclear reactor core from refueling equipment several feet above the core, such as a refueling bridge, trolley, crane, etc., using cameras or other video capture equipment supported by such refueling equipment results in inferior inspection. For example, vibrations from trolley movement or operating equipment—or even personnel footfalls on the bridge—can cause a camera, supported by the trolley while extending dozens of feet down into a reactor core, to lose picture quality and verifiable position through such vibration. Movement and distance of the refueling equipment further compounds difficulty in verifying position of any camera or other inspection device, like an ultrasonic tester, with respect to object being inspected. Thus, inspections conducted from refueling equipment several feet above a reactor during an outage typically require several different position verification mechanisms and avoidance of movement or vibration by personnel, or inspections must be repeated until satisfactory.

The Inventors has further newly recognized that inspection and tool-usage activities in a nuclear power plant when performed above and radially offset from a target, such as from a refueling bridge or reactor perimeter, interferes with effective tool usage because the target is not directly below the operator. In such circumstances, the operator may be required to lean over and/or adopt a skewed working trajectory with the tool, which complexifies visuals and makes exact radial or vertical positioning of the target, and the user relative to the target, difficult to determine. Example embodiments described below address these and other problems recognized by Inventors with unique solutions enabled by example embodiments.

The present invention is inspection devices useable in nuclear reactors and similar environments. In contrast to the present invention, the few examples discussed below illustrate just a subset of the variety of different configurations that can be used as and/or in connection with the present invention.

Figure 2:
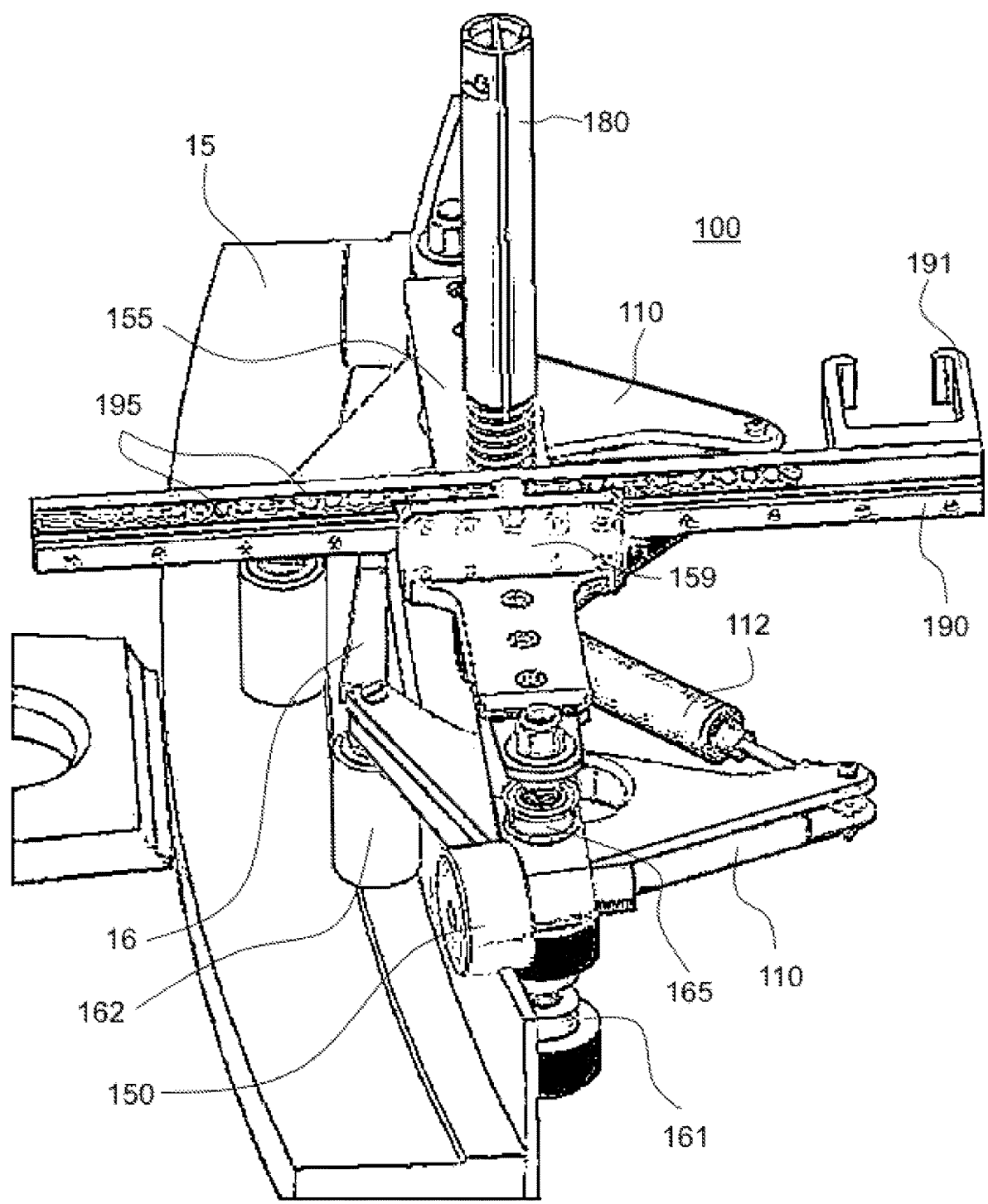
FIG. 2 is an illustration of an example embodiment inspection assembly mounted to a steam dam.
Figure 3:
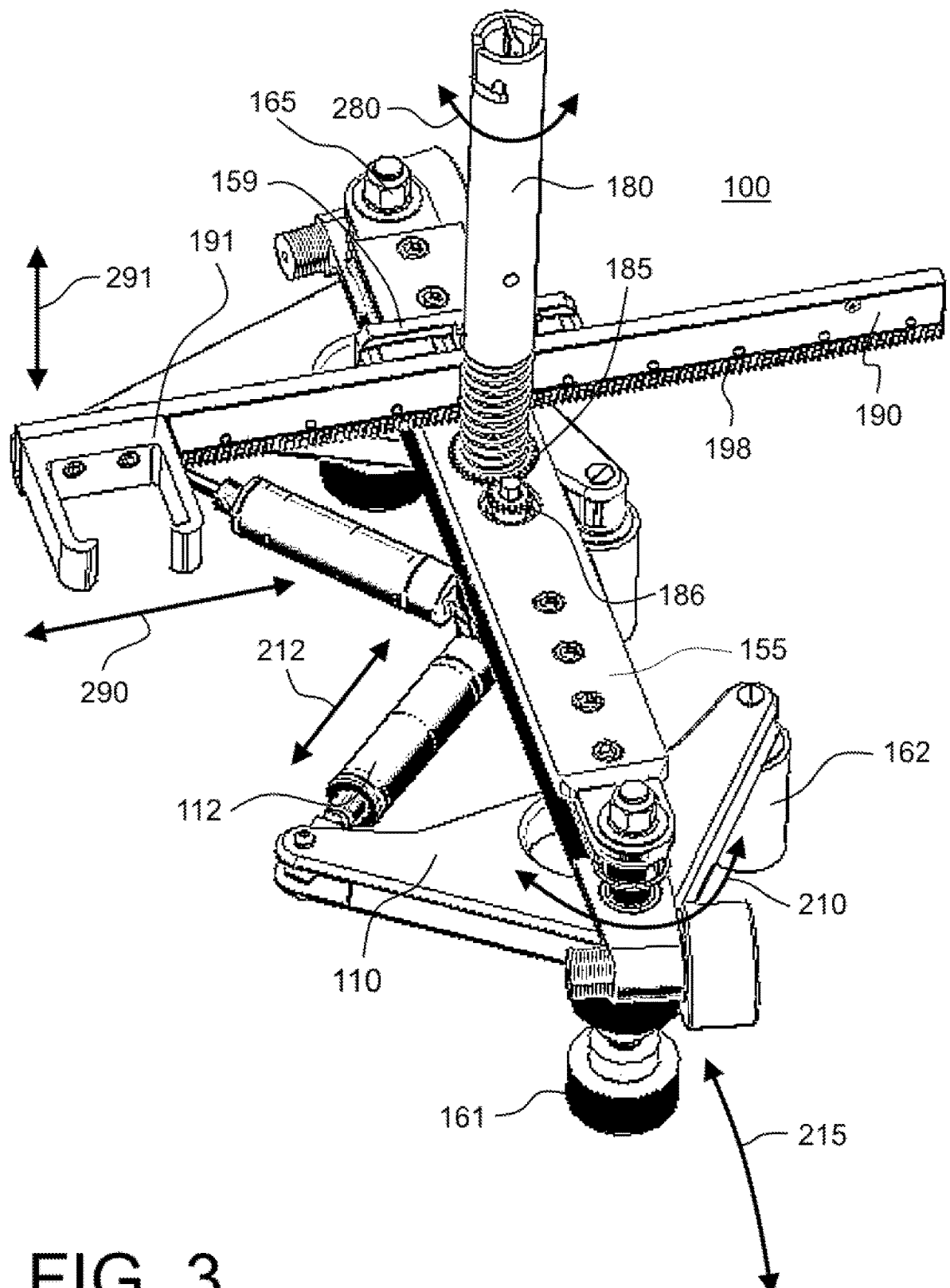
FIG. 3 is another illustration of the example embodiment inspection assembly from FIG. 2.

FIGS. 2 and 3 are illustrations of an example embodiment inspection assembly 100 useable in nuclear reactors. As shown in FIG. 2, assembly 100 is useable in conjunction with steam dam 15 at a top of a core shroud, such as shroud 10 in FIG. 1. Assembly 100 is shown again in FIG. 3 without steam dam 15, with directions that illustrate movements assembly 100 may be capable of on steam dam 15 (FIG. 2). Example embodiment assembly 100 may removably join to steam dam 15 and be moveable about the same to inspect equipment and reactor components from steam dam 15. For example, assembly 100 may include one or more top rollers 150 that allow assembly 100 to vertically seat on an edge or flange of steam dam 15 and move circumferentially (direction 215 in FIG. 3) along steam dam 15 while top rollers 150 rotate.

Because steam dam 15 may be relatively fixed and close to structures in a core of a nuclear reactor, example embodiment assembly 100 may be advantageously positioned at verifiable and constant vertical positions from such structures by top roller 150 rolling on steam dam 15, as well as being angularly moveable along steam dam 15 to other desired positions. Top rollers 150 may be freely or selectively rotatable and even driven by a local motor or via a mechanical drive in order to facilitate desired movement or static positioning in the circumferential direction (direction 215 in FIG. 3).

Figure 4:
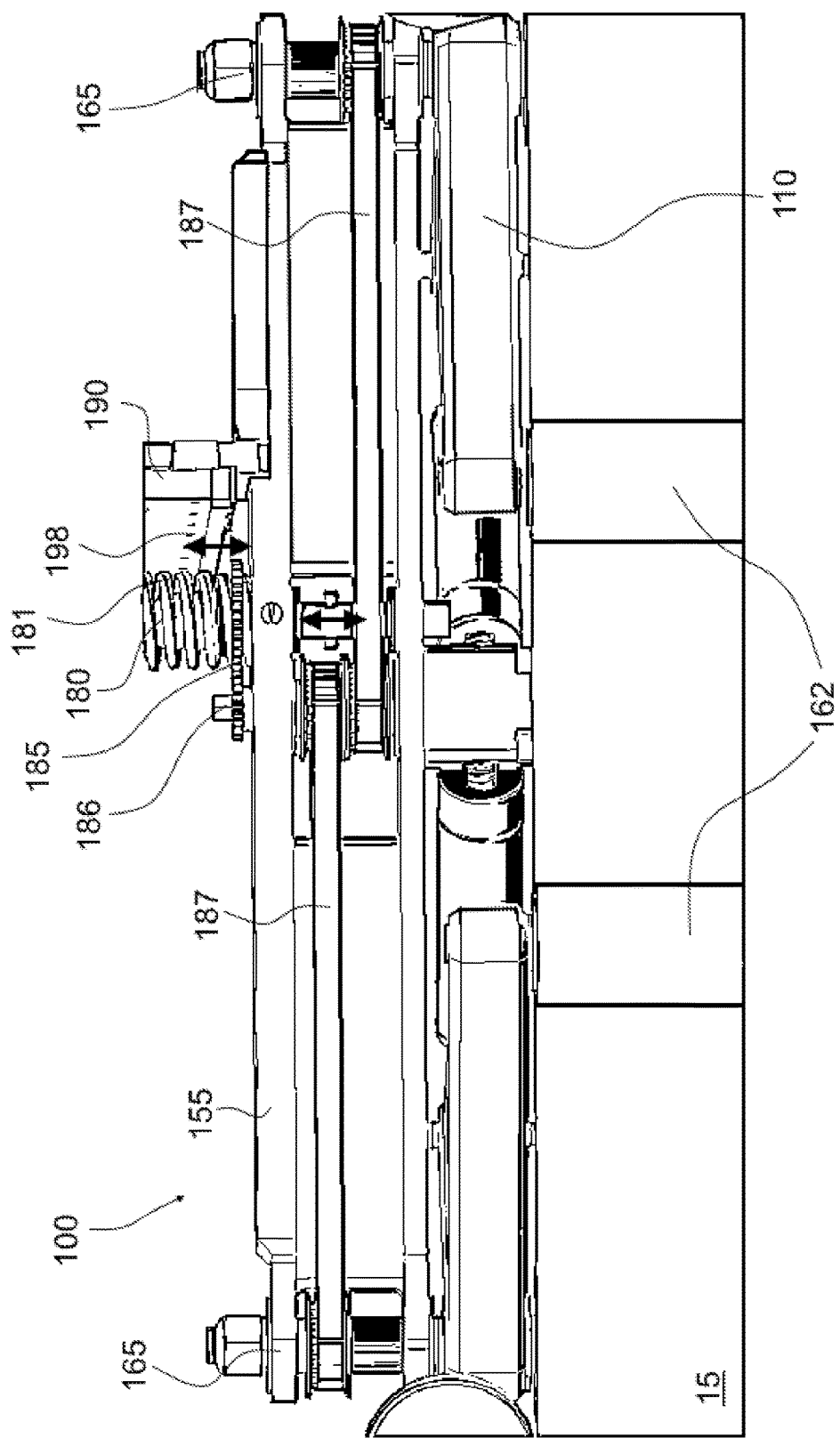
FIG. 4 is a profile illustration of the example embodiment inspection assembly from FIG. 2.

Example embodiment assembly may further include structures that removably join to an edge or flange of steam dam 15 to secure assembly 100 at a desired radial position. For example, one or more pairs of clamping rollers may join to a flange of steam dam 15 from which gussets 16 and other structures protrude. As shown in FIG. 4, paired interior clamp roller 161 and exterior clamp roller 162 may engage opposite vertical sides of steam dam 15. Paired interior and exterior rollers 161 and 162 allow assembly 100 to radially seat on an edge or flange of steam dam 15 and move circumferentially (direction 215 in FIG. 3) along steam dam 15 by rotation of rollers 161 and 162. This engagement may further facilitate positioning of assembly 100 at verifiable and constant radial positions (direction 290 is radial in FIG. 3) from structures via interior and exterior clamp rollers 161 and 162 rolling on steam dam 15. Rollers 161 and 162 may be freely or selectively rotatable and even driven by a local motor or via a mechanical drive in order to facilitate desired movement or static positioning in the circumferential direction (direction 215 in FIG. 3). An example of a mechanical drive useable to rotate rollers 161 and 162 is described further below in connection with FIG. 4.

Example embodiment inspection assembly 100, although potentially moveable in other directions, may remain static in a radial direction (direction 290 in FIG. 3) while mounted to steam dam 15. In this way example assembly 100 may be continuously positioned with steam dam 15, and inspection of any structures with example embodiment assembly 100 may be verified with a known relation to steam dam 15. Interior clamp roller 161 and exterior clamp roller 162 may forcefully seat against opposite sides of steam dam 15 to secure assembly 100 in a radial direction (direction 290 in FIG. 3). For example, as shown in FIG. 2, exterior roller 162 may be connected to a rotatable biasing arm 110 that swings about a pivot point 165 so as to move exterior roller 162 about pivot point 165 in direction 210 (FIG. 3). Interior roller 161 may be near or directly on an axis of pivot point 165, such that exterior roller 162 can torque or clamp against steam dam 15 with interior roller 161. Such spacing may create a torque arm between interior roller 161 at pivot point 165 and exterior roller 162, preventing both radial movement of assembly 100 as well as rotation of assembly 100 in the 210 direction (FIG. 3). Of course, other joining structures may selectively mate example assembly 100 with steam dam 15, including spring-based roller clamps, or elastic or mechanical clamps and attachments.

Any structure that joins example embodiment assembly 100 to steam dam 15 may be selectively disengaged to avoid gussets 16 or account for other structures that may interrupt movement along steam dam 15 in an angular direction (direction 215 in FIG. 3). Such disengagement may not interfere with an otherwise secure mounting of example assembly 100 on steam dam 15. For example, exterior clamp roller 162 may be selectively disengaged or moveable upon encountering a gusset 16 protruding from a top flange of steam dam 15, such that assembly 100 may continue moving in a circumferential direction along steam dam 15 without separating from steam dam 15. Such movement may be permitted by a spring resistively pushing arm 110 and exterior roller 162 to clamp against steam dam 15, or selective disengagement may be achieved by rotating biasing arm 110 with a pneumatic cylinder 112 as shown in FIG. 2.

For example, pneumatic cylinder 112 may rotate biasing arm 110 in direction 210 (FIG. 3) through actuation from a pneumatic line (not shown) run to assembly 100 or from a remotely controlled actuator. Such actuation of pneumatic cylinder 112 may cause expansion or contraction in direction 212 (FIG. 3), rotating exterior clamp roller 162 in direction 210 (FIG. 3) selectively against or away from steam dam 15. In the instance of contraction of pneumatic cylinder 112, exterior roller 162 may be rotated away from steam dam 15 and gusset 16 thereon. Such movement may permit exterior roller 162 to pass over gusset 16 when example assembly 100 is moving in an angular direction 215 (FIG. 3) along steam dam 15. In the instance of expansion of pneumatic cylinder 112, exterior roller 162 may be rotated toward steam dam 15 and movably secure assembly 100 thereto as discussed above.

Example embodiment inspection assembly 100 may include a pair of arms 110 each with rollers 161 and 162 and pneumatic cylinder 112 joined to a single, rigid frame 155, as shown in FIGS. 2 and 3. Through the use of plural biasing arms 110 connecting to a shared frame 155, as long as one arm 110 remains clamped, with rollers 161 and 162 biased against steam dam 15, selective disengagement of any other biasing arm(s) 110 to permit roller relocation and potentially avoid obstacles is possible while keeping assembly 100 secured in a radial direction (direction 290 in FIG. 3) with steam dam 15. That is, rollers 162 may individually step over gussets 16 or other objects without possibility of spurious movement of frame 155 in directions 290 or 210 (FIG. 3) due to other secured rollers. In this way an operator may selectively disengage only those rollers approaching or abutting an obstacle such as gusset 16, such as through individually contracting associated cylinders 112 through a pneumatic line or wireless actuator, for example, while maintaining at least one clamp roller pair 161/162 biased and secured to steam dam 15, thus overall maintaining frame 155 and example embodiment assembly 100 coupled with steam dam 15.

While a pair of biasing arms 110 with selectively controllable pneumatic cylinders 112 are shown in the example of FIGS. 2 and 3 to control positioning and clamping of pairs of rollers 161 and 162, it is understood that other selectively movable structures, such as track and gears, magnets, ball clamps, spring-biased rollers, etc., may equally be used to both provide movement of example assembly 100 in radial direction 215 (FIG. 3) and maintain a constant radial position and orientation with regard to steam dam 15 while avoiding obstacles through selective, individual disengagement.

As shown in FIG. 3, example embodiment inspection assembly 100 includes a handling rod 180 connecting to frame 155, which may be connected to an inspection arm 190 with a utility end 191. Inspection arm 190 may be moveable with respect to frame 155. For example, inspection arm may be extendible and retractable in a radial direction 290 by slidably engaging with a detent frame 159. Inspection arm 190 may include a utility end 191 shaped to secure to a tool, such as an inspection device including a camera or ultrasonic tester, for example. Utility end 191 is shown in FIG. 3 as an open-faced square jaw to secure a matching square end of a camera or other tool; however, any other shape or moveable clamping structure can be used for utility end 191. Inspection arm 190 and/or utility end 191 may be further mobile in any dimension, such as vertically in direction 291 or angularly about an axis in direction 291, either alone/separately with regard to a remainder of assembly 100 or in combination therewith. In this way, an inspection device or other tool can be engaged in utility end 191 and moved to desired radial and vertical positions through movement of inspection arm 190 and/or utility end 191, while example embodiment assembly 100 otherwise remains at a fixed radial and vertical position on a steam dam or other structure.

Handling rod 180 may operate and/or move one or more different components of example embodiment inspection assembly 100. As shown in FIG. 3, handling rod 180 may include a lower gear 185 that matches a gear track 198 of inspection arm 190. As handling rod 180 is rotated in direction 280, inspection arm 190 may be radially extended or retracted in direction 290 by gear 185 meshing with gear track 198 and driving inspection arm 190 in direction 290 as inspection arm 190 slides in detent frame 159. As shown in FIG. 2, inspection arm 190 may include one or more indentations 195 along its length that pass through detent frame 159, which may include a spring or other biased element that matches with one of the indentations 195 and resists further free extension or retraction of inspection arm 190. In this way, inspection arm 190 may be extended at known or desired intervals based on spacing of indentations 195 and resistance to further movement imparted by detent frame 195.

As further shown in FIG. 3, lower gear 185 of handling rod 180 may further be positioned to mate with circumferential drive gear 186 in frame 155 of assembly 100. Handling rod 180 may further rotate circumferential drive gear 186 by rotating in direction 280. Handling rod 180 may discriminate between inspection arm 190 and drive gear 186 by moving laterally or vertically between the two, so as to contact only one of gear track 198 or teeth of gear 186 at any time with lower gear 185. Of course, closer gear 185 may also simultaneously inspection arm 190, gear 186, and/or any other structures.

FIG. 4 is a detail illustration of a profile of example embodiment inspection assembly 100, showing some potential structures that are driveable with handling rod 180. As shown in FIG. 4, gear 185 of handling rod 180 may be vertically separated from gear track 198 and drive gear 186; that is, gear 185 may engage only one of drive gear 186 and gear track 198 depending on a vertical displacement. Spring 181 may bias gear 185 downward such that a default engagement is with driver gear 186 and an upward force must be imparted by an operator of rod 180 to move upward and engage gear track 198. A lower stem of pole 180 may be captured by frame 155 to permit limited vertical movement of lower gear 185 between drive gear 186 and gear track 198, shown by matching vertical arrows in FIG. 4.

Circumferential drive gear 186 may power one or more interior clamp rollers 161 (FIG. 2), as discussed above in connection with FIG. 2. For example, as shown in FIG. 4, drive gear 186 may connect to one or more transmissions 187 between drive gear 186 and pivot points 165. Transmission 187 may be an extension that transfers rotation between drive gear 186 and roller 161 (FIG. 2) via pivot point 165, such as a gearbox or a chain or band that rotates with gear 186 and pivot point 165 to turn interior rollers 161. In this way, when handling pole 180 is engaged with drive gear 186 and rotated in direction 280 (FIG. 3), the force may be transmitted via transmission 187 to one or more interior rollers 161 biased against steam dam 15. In this way, example embodiment inspection assembly may be moved in circumferential direction 215 (FIG. 3) through rotation of handling pole 180. When handling rod 180 is raised against spring 181 so that lower gear 185 mated with gear track 198, similar rotation of handling rod 180 may instead move inspection arm 190.

Handling rod 180 may extend several feet vertically, potentially all the way outside of any opened and flooded reactor, to human operators well above steam dam 15. Handling rod 180 may include a U-joint or flexible portion surrounded by spring 181 to permit some non-vertical/off-axis positioning while still transferring rotation to gear 185. Handling rod 180 may further include voids or floats to offset any weight of rod 180 or entire assembly 100, resulting in better vertical positioning of rod 180 under tension from such floats or cavities when submerged in reactor coolant. Odometers, rotation counters, electrical sensors, and the like are useable in connection with pole 180 to track and/or display an accurate position and/or number of turns of handling rod 180 in connection with gear 186 and/or inspection arm 190. In this way, a user may be able to accurately track a degree of circumferential movement of example assembly 100 and/or a degree of radial extension/retraction of inspection arm 190.

Although example embodiment inspection assembly 100 is shown with a handling rod 180 driving various features of assembly 100, including circumferentially-driving rollers and an inspection arm, it is understood that any number of different power-providing devices and powered components are useable in assembly 100. For example, handling rod 180 may be powered to automatically rotate and raise/lower to interact with desired components by an operator handling the same from above; or handling rod 180 may drive other rollers, arms, and utility end movements in example embodiments. Or, for example, one or more remotely-operated motors may control movement and biasing of any or all of rollers 150, 161, and 162, inspection arm 190, and biasing arms 110. In this way, a remote user may still control movement of assembly in direction 215, actuation and release of rollers 161 and 162, and/or radial or vertical movement of inspection arm 190. Such motors may equally be paired with sensors that measure and report a degree of movement or force in any controlled element of assembly 100. Such sensors and controls may further power and control any inspection device, such as a camera or ultrasonic tester, paired with utility end 191.

Example embodiment inspection assembly 100 is thus mountable to and moveable on a steam dam or other structure in a nuclear reactor environment. Several different inspection devices or other tools can be installed on assembly 100 and moved about a reactor core or other operating area. Because example assembly is moveable in a circumferential or angular direction while remaining vertically and radially stationary, inspection devices or tooling mounted on assembly 100 may remain at set positions with regard to a known structure like a steam dam. Movement of an instrumentation arm may provide discreet and known radial or vertical positioning that may always be determinable against a known position of assembly 100.

Example embodiment inspection assembly 100 is configured to operate in a nuclear reactor environment submerged in reactor coolant. As such, assembly 100 may be fabricated entirely of materials that maintain their physical characteristics in a reactor and radioactive environment. For example, glasses, hard plastics like HDPE, nickel alloys like Inconel, stainless steels, and/or zirconium alloys may all be used for various components of assembly 100 without risk of significant degradation or contamination. Similarly, although example embodiment inspection assembly 100 is illustrated with only mechanical and pneumatic features, any electrical sensors, controls, or motors may be waterproofed an outfitted with appropriate electrical wired or wireless connections to permit submerged operation and control.

Example embodiments and methods thus being described, it will be appreciated by one skilled in the art that example embodiments may be varied and substituted through routine experimentation while still falling within the scope of the following claims. For example, a variety of different structures aside from a steam dam atop a core shroud, as well as different sizes and configurations of steam dams, are compatible with and useable with example embodiments and methods simply through proper dimensioning of example embodiments—and fall within the scope of the claims. Such variations are not to be regarded as departure from the scope of these claims.

What is claimed is:

1. A positioning apparatus for use in a shutdown nuclear reactor, wherein the apparatus comprises:
   a clamp configured to clamp on opposite sides of a steam dam in the nuclear reactor, wherein the clamp allows circumferential movement of the apparatus along the steam dam and prevents radial and vertical movement of the apparatus relative to the steam dam; and
   an arm extendible from the clamp, wherein the arm is configured to hold a tool.

2. The apparatus of claim 1, wherein the clamp includes at least two rollers configured to roll against opposite sides of the steam dam.

3. The apparatus of claim 2, further comprising:
   a plurality of rotatable arms, each of the arms including at least two of the rollers, wherein a first roller of the two rollers is positioned at a pivot point of the rotatable arm, and wherein a second roller of the two rollers is positioned away of the pivot point so as to permit the second roller to rotate against an opposite side of the steam dam from the first roller.

4. The apparatus of claim 3, further comprising,
   a frame to which the plurality of rotatable arms rotatably join each at the pivot point; and
   a plurality of pneumatic cylinders each connected between one of the rotatable arms and the frame.

5. The apparatus of claim 1, wherein the extendible arm is moveable at least one of radially and vertically relative to the apparatus.

6. The apparatus of claim 1, further comprising:
a drive rod extending vertically upward from the clamp, wherein the drive rod connects to and moves at least one of the clamp and the arm through rotation of the drive rod.

7. The apparatus of claim 6, wherein the drive rod is moveable vertically to connect to and move only one of the clamp and the arm.

8. The apparatus of claim 7, further comprising:
a transmission configured to drive the clamp in the circumferential direction along the steam dam, wherein the drive rod includes a gear configured to mesh with the arm and the transmission such that rotation of the drive rod extends the arm or moves the apparatus in the circumferential direction.

9. A positioning apparatus for use in a shutdown nuclear reactor, wherein the apparatus comprises:
a frame;
a plurality of roller pairs joined to the frame, wherein each roller pair includes two rollers moveable to clamp and secure the frame to a structure in the nuclear reactor, wherein the two rollers when clamped allow movement of the frame in a first direction relative to the structure and disallow movement of the frame in a second direction perpendicular to the first direction; and
an arm extendible from the frame, wherein the arm is configured to hold a tool.

10. The apparatus of claim 9, wherein the first direction is angular, wherein the second direction is radial, and wherein the apparatus is configured to be operable underwater.

11. The apparatus of claim 9, wherein only one of the roller pairs when clamped allows the movement in the first direction and disallows the movement in the second direction.

12. The apparatus of claim 9, further comprising:
a plurality of clamp arms rotatably joined to the frame, wherein each clamp pair is mounted on a corresponding one of the clamp arms with the two rollers spaced apart with respect to a pivot point of the clamp arm.

13. The apparatus of claim 12, further comprising:
a plurality of extendible connectors each joined between a corresponding one of the clamp arms and the frame, wherein the extendible connectors are configured to extend and retract so as to rotate the corresponding clamp arms and clamp the rollers on opposite sides of the structure.

14. The apparatus of claim 9, further comprising:
a drive configured to forcibly rotate at least one of the two rollers so as to drive the frame in the first direction.

15. The apparatus of claim 14, wherein the drive is further configured to selectively extend or retract the arm in the second direction.

16. The apparatus of claim 15, wherein the drive includes a drive rod connected to the frame and moveable between two positions, and wherein the drive rod when rotated at a first position of the two positions extends or retracts the arm in the second direction, and wherein the drive rod when rotated at a second position of the two positions drives the frame in the first direction.

17. The apparatus of claim 16, wherein the structure is a steam dam of the nuclear reactor, and wherein the apparatus further comprises:
a plurality of top rollers joined to the frame and configured to roll about a top of the steam dam and prevent vertical movement of the frame.

18. A method of inspecting a shutdown nuclear reactor with an apparatus including a clamp configured to clamp on opposite sides of a steam dam in the nuclear reactor, the clamp allowing circumferential movement of the apparatus along the steam dam and preventing radial and vertical movement of the apparatus relative to the steam dam, an arm extendible from the clamp, the arm being configured to hold a tool, and a drive rod extending vertically upward from the clamp, the drive rod connecting to and moving at least one of the clamp and the arm through rotation of the drive rod, the method comprising:
rotating the drive rod in a first position to move the apparatus circumferentially along the steam dam;
moving the drive rod to a second position; and
rotating the drive rod in the second position to move the arm radially from the steam dam.

19. The method of claim 18, further comprising:
releasing at least one of the rollers so as to step over a structure circumferentially on the steam dam.

20. The method of claim 18, wherein the moving the handling pole to the second position includes vertically raising the handling pole to disengage the rollers and engage the arm, and wherein the apparatus is underwater throughout the rotating, the moving, and the rotating.

* * * * *